United States Patent [19]

Tarnay et al.

[11] Patent Number: 4,655,486
[45] Date of Patent: Apr. 7, 1987

[54] WATER FAUCET INLET LINE CONNECTOR

[75] Inventors: Matthew Tarnay, Pasadena; Robert Szemeredi, Tujunga, both of Calif.

[73] Assignee: Price Pfister, Inc., Pacoima, Calif.

[21] Appl. No.: 827,252

[22] Filed: Feb. 7, 1986

[51] Int. Cl.⁴ .............................................. F16L 19/00
[52] U.S. Cl. ...................................... 285/340; 285/38; 285/334.4; 285/382.7; 285/343
[58] Field of Search .............. 285/38, 238, 340, 334.4, 285/354, 382.7, 342, 343, 8

[56] References Cited

U.S. PATENT DOCUMENTS

| | | | |
|---|---|---|---|
| 2,158,757 | 5/1939 | Kuestermeier | 285/340 |
| 2,284,365 | 5/1942 | Briegel | 285/340 |
| 2,484,192 | 10/1949 | Squiller | 285/340 X |
| 2,785,910 | 3/1957 | Munger | 285/22 |
| 2,831,711 | 4/1958 | Leadbetter | 285/238 |
| 3,697,102 | 10/1972 | Falke | 285/340 |
| 4,082,326 | 4/1978 | Bryson | 285/238 |
| 4,084,843 | 4/1978 | Gassert | 285/340 X |
| 4,124,235 | 11/1978 | Grahl et al. | 285/340 |
| 4,146,254 | 3/1979 | Turner et al. | 285/340 X |
| 4,346,923 | 8/1982 | Smith et al. | 285/340 |

Primary Examiner—Richard J. Scanlan, Jr.
Attorney, Agent, or Firm—Blakely, Sokoloff, Taylor & Zafman

[57] ABSTRACT

A water faucet inlet line connector for providing a quick and reliable attachment of an inlet water line to the shank of a water faucet is disclosed. The connector is comprised of an assembly of two body members entrapping a conical spring washer therebetween. The upper body member has a tapered outer surface for cooperating with the conical inner surface of the connection end of the faucet shank, and preferably includes on its inner cylindrical diameter a ring-like inward protrusion to provide a ring-like region of increased pressure against the inlet tube when the connector and tube are finally locked in position. The lower body member also has a cylindrical inner surface, and cooperates with the upper body member to retain the conical spring therebetween, to align the water line and to provide a stress relief to help isolate inlet line motion from the region of the conical spring and the upper body member. In use a slip nut is placed on the inlet line and then the connector is forced over the end of the inlet line, lower body member first, to force the end of the inlet line through the conical spring to bottom against the top end of the upper body member, with the conical spring firmly gripping the inlet tube to prevent the withdrawal of the tube from the assembly. The upper body member is then inserted into the conical opening of the shank and the lock nut tightened onto the externally threaded lower end of the shank to force the upper body member further into the shank opening, causing the upper body member to forceably constrict to firmly seal against both the inlet line and the faucet shank. Various additional aspects, preferred materials and the like are disclosed.

23 Claims, 5 Drawing Figures

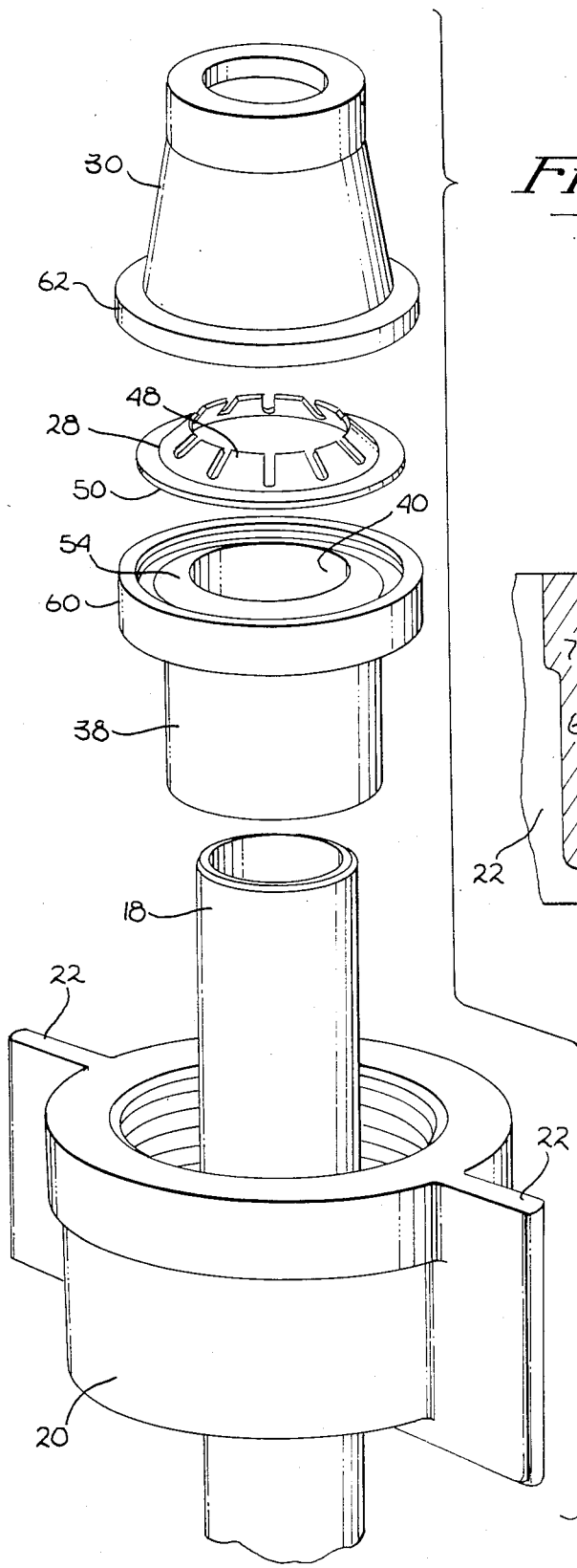
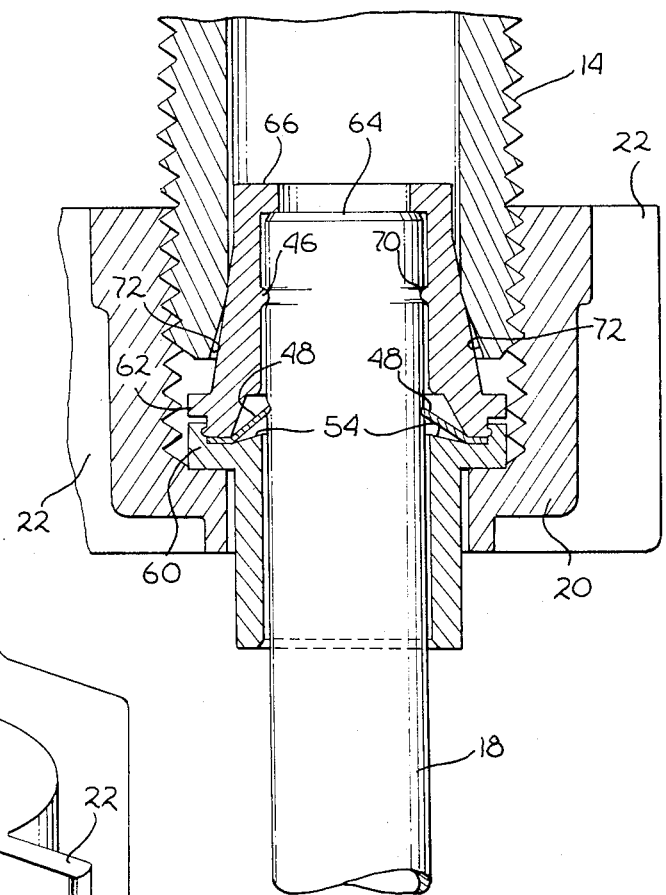
Fig. 4
Fig. 5

WATER FAUCET INLET LINE CONNECTOR

BACKGROUND OF THE INVENTION

1. Field of the Invention

The present invention relates to the field of faucet shankwater line connecting devices.

2. Prior Art

At the present time the most common method of connecting a water line to the shank of a water faucet is through the use of a rubber member having an inner diameter for loosely fitting over water line, and an outer shape configured to cooperate with the tape in the shank so as to be squeezed in compression when forced thereinto. A lock nut is used to threadedly engage the outer diameter of the shank to force the rubber member further into the shank, normally with a metal back-up ring between the rubber member and the lock nut to provide a sliding bearing surface between the lock nut and a the back-up ring to facilitate the required rotation of the nut during installation.

In general, the foregoing type of connection works well when properly installed. However, on occasion, difficulties can arise which can have undesirable or even disastrous consequences. In particular, there is no positive manner of determining how far the inlet tube has been inserted into the shank unless one takes the time to put a reference mark on the inlet tube before assembly. Consequently, through a desire to be sure that the rubber member is grasping the inlet line, the inlet line may be inserted too far to project into the region of the valve seat, thereby interfering with the normal operation of the faucet valve. In other instances, the inlet may not be inserted far enough so as to be blown out at some later date when no one is around. This obviously is disastrous in comparison to merely developing a small leak, as expulsion of the water line, whether for this reason or for any other reason, opens the full cross sectional area of the inlet line which can substantially flood a home within a relatively short time. Further of course, most current installations require the connection to be made within a cabinet under the sink, in a region behind and generally well hidden by the sink itself, thereby putting a premium on the ability of an installer to make a highly reliable connection in an absolute minimum of time while in an uncomfortable and awkward position under the sink.

Systems are known for making quick connection to pipe and tubing, both plastic and metal, by pressing the end of a fitting onto the tubing. One example of such a connection system is the Connect & Flex system of Delta Faucet Company. The system is intended to be used in conjunction with polybutylene and copper tubing, and includes a plurality of push-on fittings such as couplings, T's, elbows, reducers and the like. Each of these fittings includes a fitting body molded of acetal material having therein an elastomeric seal (ethylene propylene) and stainless steel tube retaining clip for each tubing end opening (two for couplings, three for T's, etc.). The body further includes a positive stop for the tubing so that, by way of example, tubing inserted in one end of a coupling cannot be overinserted so as to subsequently interfere with the insertion, sealing and locking of the end of another tube into the opposite opening of the coupling. Other coupling devices of similar types utilizing a rubber or elastomeric seal and/or a conical spring for retaining the tube to the coupling are shown in U.S. Pat. Nos. 2,158,757; 2,284,365; 2,484,192; 2,785,910; 2,831,711; 3,697,102; 4,084,843; and 4,146,254, the latter patent now being owned by the manufacturer of the Connect & Flex system hereinbefore described. All of the foregoing systems however, are intended to provide a means for making a connection between a tube and the connector or coupling itself, with the connector requiring a separate attachment method for attaching to another device if the ultimate desire is to connect the tubing for fluid communication with another device. As shall be seen, the connector of the present invention provides all of the desired functions, yet in so doing, only serves as an intermediary to facilitate what in effect is the direct connection of the water line to the faucet shank.

BRIEF SUMMARY OF THE INVENTION

A water faucet inlet line connector for providing a quick and reliable attachment of an inlet water line to the shank of a water faucet is disclosed. The connector is comprised of an assembly of two body members entrapping a conical spring washer therebetween. The upper body member has a tapered outer surface for cooperating with the conical inner surface of the connection end of the faucet shank, and preferably includes on its inner cylindrical diameter a ring-like inward protrusion to provide a ring-like region of increased pressure against the inlet tube when the connector and tube are finally locked in position. The lower body member also has a cylindrical inner surface, and cooperates with the upper body member to retain the conical spring therebetween, to align the water line and to provide a stress relief to help isolate inlet line motion from the region of the conical spring and the upper body member. In use a slip nut is placed on the inlet line and then the connector is forced over the end of the inlet line, lower body member first, to force the end of the inlet line through the conical spring to bottom against the top end of the upper body member, with the conical spring firmly gripping the inlet tube to prevent the withdrawal of the tube from the assembly. The upper body member is then inserted into the conical opening of the shank and the lock nut tightened onto the externally threaded lower end of the shank to force the upper body member further into the shank opening, causing the upper body member to forceably constrict to firmly seal against both the inlet line and the faucet shank. Various additional aspects, preferred materials and the like are disclosed.

BRIEF DESCRIPTION OF THE DRAWINGS

FIG. 4 is an exploded view of the connector of FIGS. 2 and 3 further illustrating the water line and the lock nut in relation thereto.

FIG. 5 is a partial cross section taken through the central axis of the faucet shank illustrating the cooperation of the various parts to effect the desired water seal and anchoring of the water line in the assembly.

DETAILED DESCRIPTION OF THE INVENTION

Figure 1:
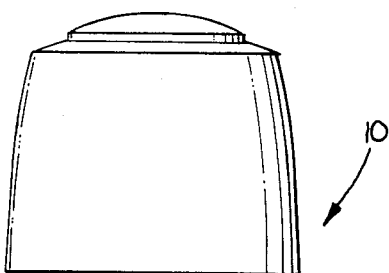
FIG. 1 is a partial cross sectional view of a portion of a typical faucet installation illustrating the present invention connector connecting an inlet water line to a water faucet shank.

First referring to FIG. 1, a partial cross section of a typical sink faucet installation may be seen. The faucet assembly, a portion of which is shown as faucet assembly 10, is mounted to the sink through a pair of mounting holes 12 (only one being shown in FIG. 1) with the threaded shank 14 of each of the hot and cold water faucet valves passing through a respective opening 12 in the sink and being retained with respect thereto by a lock ring or nut 16.

The purpose of the present invention is the coupling of the water supply line or tube 18 to the lower end of the threaded shank 14, with the present invention connector being ultimately locked in place by a lock nut, such as plastic lock nut 20 having wings 22 thereon to be easily manually tightened as required. The connector itself is shown in perspective in FIG. 2, and in cross section in FIG. 3, in which Figure the tube 18 is also shown in phanton. In addition, the connector assembly, together with tube 18 and wing nut 20, are shown in an exploded view in FIG. 4. The connector is comprised of an upper body member 24 and a lower body member 26, with a spring member 28 entrapped between the two body members, the spatial relation of upper and lower being relative to the normal installation orientation as illustrated in FIG. 1. Externally the upper body member 24 is characterized by a tapered region 30 terminating at one end by a short cylindrical section 32 and at the other end by an annular flange 34 substantially the same size as the adjacent annular flange 36 of the lower body member 26. The lower body member 26 in turn has a cylindrical main section 38 with an inner diameter 40 sized for a loose slip fit over the end of the water inlet line 18. Similarly, the upper body member 24 of the connector has corresponding cylindrical inner surfaces 42 and 44 separated by a rounded inner ring-like protrusion 46, the inner diameter of which preferably provides a slip fit onto a typical inlet line 18, as distinguished from the relatively loose slip fit of the cylindrical sections. Finally, the conical spring member 28 has an inner diameter defined collectively by the inner ends of the various spring elements 48 which is significantly smaller than the outer diameter of the typical inlet line 18 with which the connector will be used.

The conical spring 28, aside from the conically oriented spring elements 48, has a flat peripheral region 50 (See FIG. 4) which is entrapped between the upper and lower body members 24 and 26. The upper body member 24 is further provided with a conical relief 52 into which the individual spring elements 48 may flex upon the insertion of a water inlet line 18 therethrough. The lower body member 26, on the other hand, rather than being similarly relieved, has a projecting tapered region 54 of a substantially shallower angle than the spring elements 48. As shall subsequently be seen, the protruding region 54 of course has no effect on the insertion of the water inlet line 18 through the spring member, though even upon the occurrence of an extraordinary force on the inlet line attempting to withdraw the same from the connector, the region 54 will prevent the spring elements 48 from snapping through center to allow the withdrawal of the line.

The two body members 24 and 26 may be joined to each other in substantially any manner desired, and in fact need not be joined with any special integrity as they are forceably held together when in use. In that regard, even if the connector assembly were to come apart, the parts can only be reassembled with the spring member 28 in the proper orientation, as the tapered protrusion 54 will prevent the assembly of the parts if the spring member is inadvertently put in upside down.

In the preferred embodiment, the upper body member 24 and lower body member 26 are designed to snap together utilizing a peripheral protrusion 56 on the upper body member and a cooperatively disposed inward facing depression 58 within a flange-like protrusion 36 on the lower body member 26. The flange-like protrusion 60 in conjunction with a corresponding flange-like protrusion 34 on the upper body member together define a single clamping flange for the assembly. The snapping together of the entire assembly in this manner allows for the low cost manufacture of the connector, as the protrusion 56 and depression 58 may readily be formed at the time of injection molding the respective body member, the molded parts having sufficient flexibility to be ejectable from a noncollapsable mold while still preserving the desired protrusion and depression. Also the snapping together of the parts as in the preferred embodiment is conductive to high speed automated assembly procedures, and even in the event of inadvertent or intentional disassembly of the connector in the field, as stated before, it may only be reassembled with the spring member in the proper orientation. Obviously other assembly techniques such as, by way of example, ultrasonic welding, solvent welding and the like, could be used, though these techniques are in general more costly, time consuming and unnecessary.

Figure 3:
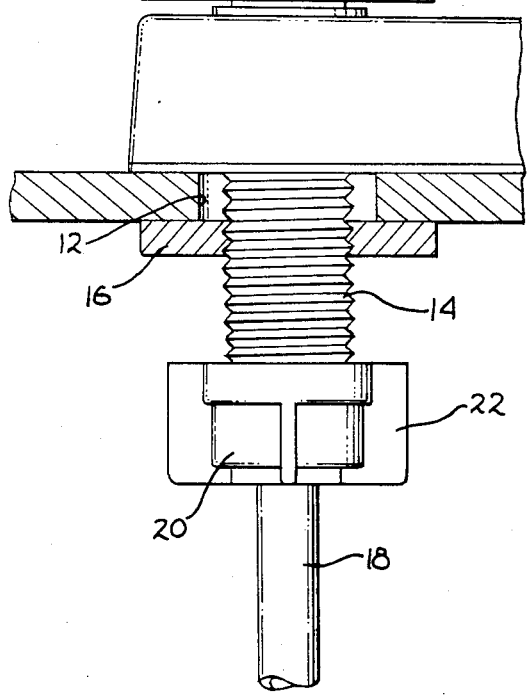
FIG. 3 is a cross section taken through the longitudinal axis of the connector of FIG. 2.
Figure 3:
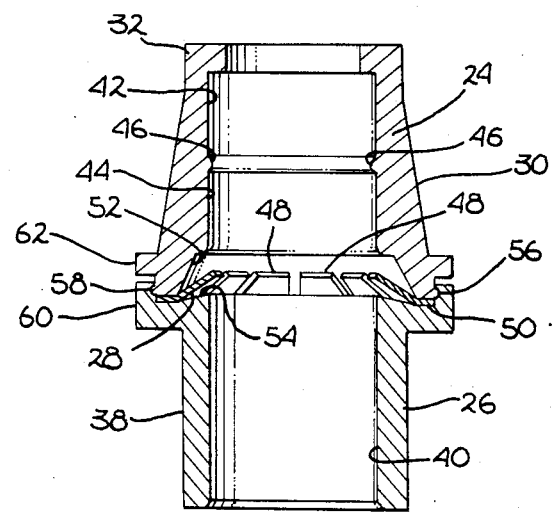
Figure 2:
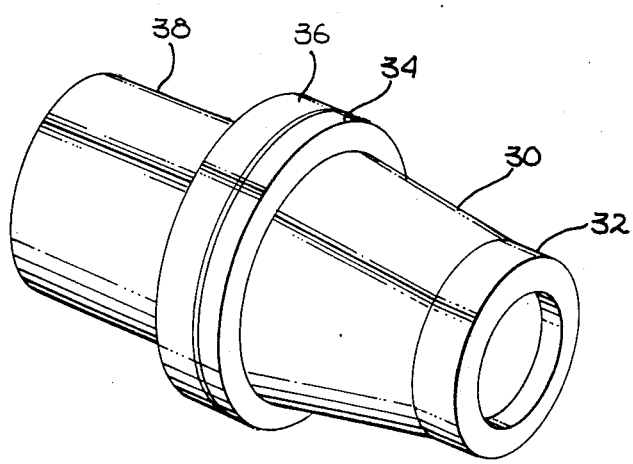
FIG. 2 is a perspective view of the preferred embodiment connector assembly of the present invention.

Now referring to FIG. 5, a partial cross section of an installed connector in accordance with the present invention may be seen. To effect installation the connector assembly of FIGS. 2 and 3 is first forced over the end of the water inlet line 18 until the end 64 of the line abuts a stopping shoulder 66 at the upper end of the upper body member. Proper insertion of the line 18 into the connector may be readily visually verified, as this may be done in full view of the installer prior to inserting the connector into the shank 14 of the faucet. Note that no special preparation of the inlet line 18 is required beyond reasonable deburring of the end 64 of the line. In that regard annular depressions in the inlet line are shown in FIG. 5 in regions 68 and 70, though these depressions (shown in exaggerated form for clarity) are formed by the action of the connector and the otherwise cylindrical inlet line 18 rather than being formed in the inlet line prior to assembly.

Once the connector is properly positioned on the end of the inlet line (lock nut 20 being either first placed over the end of the line or later strung on the line from the opposite still unattached end of the line), the connector is inserted into the lower tapered end of the shank 14 and the lock nut 20 tightly threaded onto the lower end of the shank. In that regard, it is to be noted that the taper 72 on the lower end of the shank is an industry standard configuration provided to cooperate with the prior art rubber connections and of course cooperating with the present invention connector for the desired result. In that regard, as the lock nut 20 is tightened, the engagement of the lock nut against the lower surface of flange-like area 60 on the lower body member forces the entire connector and inlet line 18 therein into the taper 72 of the shank 14, thereby squeezing the upper body member 24 so that the protrusion 46 thereon tightly squeezes down on tube 18 to provide an effective and reliable seal with respect thereto. Also of course, the pressure between the outer periphery of the upper body member 24 and the region of contact of the same with the tapered shank 14 similarly affects a seal in that location, thereby effectively coupling line 18 to the shank 14 in a watertight manner.

The protrusion 46 aids in developing a good watertight seal between the upper body member 24 and the inlet water line 18 in two ways. First, assuming one could only generate a certain amount of sealing force between two members, it is best to distribute that force over a reasonably small area, as that tends to maximize the sealing pressure to provide maximum integrity against leakage when subjected to the substantially lower operating fluid pressures. Further, while a copper tube for the water inlet line 18 will be relatively rigid and not generally compressed in response to the pressures of the protrusion 46 thereon, other inlet tubes such as polybutylene tubing will not be so rigid, and will tend to deform. The concentration of the sealing pressure over a ring-like area of a very limited axial length of the inlet tube 18, as by the protrusion 46, allows the cross section of the tubing adjacent the ring to provide additional radial support to the portion of the tubing under the protrusion, again tending to aid in the establishment of a good high pressure seal in that region. In that regard, it will be noted that the tape in region 30 of the connector is shown as being similar to, but not the same as, the taper in the bottom of shank 14, tending to concentrate the compressive forces on the upper body member 24 of the installed connector at the approximate axial position of the protrusion 46, not only aiding the seal at the position, but also increasing the local pressure and thus the integrity of the seal between the shank and the upper body member over that which might otherwise be obtained if the cone angles of the two mating parts were identical.

In the preferred embodiment, spring member 28 is fabricated of stainless steel to prevent corrosion, even if the spring member becomes wet during installation, with the angle and length of the spring members 48 being selected together with the thickness of the member to sufficiently forceably engage a water line inserted therethrough, the angle being sufficiently shallow to reliably cause the spring members to bite into a water line to prevent the withdrawal or expulsion thereof even if the water line tends to be of a self-lubricating material, such as polybutylene. The upper body member 24 should be fabricated of a plastic which will constrict when subjected to sufficient force without breaking, yet have sufficient creep resistance to maintain its shape as so deformed, even when subjected to the pressures and temperatures of the environment. While a number of plastics could be used, a material such as nylon is preferred as having the foregoing desired characteristics, and further being hygroscopic so as to have a significant water absorption and physical expansion as a result thereof, thereby only increasing the integrity of the seal after installation. The lower body member 26 may in turn be fabricated of the same plastic as the upper body member, though in the preferred embodiment an acetal is used as rigidity, stability, etc., are more desired characteristics than the deformability, water absorption and expansion, etc. of the material of the upper body 24. The lock nut 20 of course may be any of a number of suitable plastics, if a plastic is used, such as ABS, though of course a simple brass lock nut for tightening by a wrench may also be provided.

There has been described herein a new connector for connecting a water line to a faucet shank which is simple, low cost, easy to install and reliable. The connector receives and limits the penetration of and locks onto the water line prior to any insertion thereof into the faucet shank, with the single operation of tightening the lock nut either manually or with a wrench providing the desired seal both between the water line and the connector, and the connector and faucet shank. While the present invention has been disclosed and described herein with respect to a preferred embodiment thereof, it will be understood by those skilled in the art that various changes in form and detail may be made therein without departing from the spirit and scope of the invention.

We claim:

1. An inlet water line connector for connecting an inlet water line having a predetermined outer diameter to the end of a water faucet shank having external threads on the outer cylindrical surface and a tapered internal inlet region larger in diameter than said predetermined outer diameter of the inlet water line, comprising a body having first and second ends and an opening therethrough, into which first end an inlet water tube of the predetermined outer diameter may be inserted, said body having an outer tapered surface for fitting within and engaging the tapered internal inlet region of a faucet shank, and an internal sealing surface within the portion of said body having said outer tapered surface, said internal sealing surface being a means for fitting over and substantially conforming to the circular periphery of an inlet water line, said body also having a shoulder in the form of an outward directed flange on said body between said outer tapered surface and said first end thereof against which said connector may be forced into the internal inlet region of a faucet shank with said outer tapered surface having a force fit with the tapered internal inlet region of the faucet shank, a unitary spring member within said body having a plurality of integral spring elements projecting inward and angled toward said second end of said body, said spring elements in a free state collectively defining an inner periphery thereof of a diameter less than the predetermined outer diameter of the water line, said spring elements being elastically deflectble further toward said second end by the insertion of a water line therethrough from said first end of said body and to forceably engage the water line to resist withdrawal thereof, at least the portion of said body having the outer tapered surface and internal sealing surface being fabricated from a deformable material, whereby a water line may be pushed into said connector from said first end thereof, said connector may be inserted into said faucet shank with the outer tapered surface of said connector engaging said tapered internal inlet region of said shank and then forced thereinto to force tight engagement of the two tapers to effect a seal therebetween, and to at least locally constrict said body to effect forceful engagement of said internal sealing surface on the periphery of the inlet water line.

2. The connector of claim 1 wherein said internal sealing surface comprises an inward circular projection of limited axial extent, whereby the sealing force between said body and an inlet water line therein is concentrated within a small area.

3. The connector of claim 1 wherein said body has an inward directed shoulder adjacent said second end thereof having an opening of less than the predetermined outer diameter of an inlet water line, thereby providing a positive limit stop upon the insertion of a water line into said connector from said first end thereof.

4. The connector of claim 1 wherein said spring member is positioned between said internal sealing surface and said first end of said connector, whereby when installed, said spring member is isolated from water in the inlet line and the faucet shank.

5. The connector of claim 1 wherein the elastic deflection of said spring elements is constrained by said body to prevent said spring elements from deflecting to become substantially coplanar.

6. The connector of claim 1 wherein said outer tapered surface of said body is a different taper than the tapered internal inlet region of the shank.

7. The connector of claim 1 wherein said body is comprised of first and second body members, said first body member extending from approximately the axial location of said spring member to said first end of said body, and said second body member extending from approximately the axial location of said spring member to said second end of said body, said spring member being trapped between said first and second body members.

8. The connector of claim 7 wherein said second body member is hygroscopic.

9. The connector of claim 8 wherein said second body member is a nylon member.

10. The connector of claim 7 wherein said first and second body members have complementary surfaces for snapping together to entrap said spring member therebetween.

11. The connector of claim 1 wherein said body is plastic.

12. The connector of claim 1 further comprised of a lock nut for threading onto a faucet shank and engaging said shoulder of said connector body inserted into the shank and containing the end of a water line inserted thereto, whereby said lock nut may be tightened to force tight engagement of the two tapers to effect a seal therebetween, and to at least locally constrict said body to effect forceful engagement of said internal sealing surface with the periphery of the inlet water line.

13. The connector of claim 12 wherein said lock nut is plastic.

14. The connector of claim 13 wherein said lock nut includes wings for the tightening thereof by hand.

15. An inlet water line connector for connecting an inlet water line having a predetermined outer diameter to the end of a water faucet shank having external threads on the outer cylindrical surface and a tapered internal inlet region larger in diameter than said predetermined outer diameter of the inlet water line, comprising a body having first and second ends and an opening therethrough, into which first end an inlet water tube of the predetermined outer diameter may be inserted, said body having an outer tapered surface for fitting within and engaging the tapered internal inlet region of a faucet shank, and an inward circular projection of limited axial extent forming an internal sealing surface within the portion of said body having said outer tapered surface, said internal sealing surface being a means for fitting over and substantially conforming to the circular periphery of an inlet water line, said body also having a shoulder against which said connector may be forced into the internal inlet region of a faucet shank with said outer tapered surface having a force fit with the tapered internal inlet region of the faucet shank, a unitary spring member wtihin said body between said internal sealing surface and said first end of said connector, said spring member having a plurality of integral spring elements projecting inward and angled toward said second end of said body, said spring elements in a free state collectively defining an inner periphery thereof of a diameter less than the predetermined outer diameter of the water line, said spring elements being elastically deflectable further toward said second end by the insertion of a water line therethrough from said first end of said body and to forceably engage the water line to resist withdrawal thereof, and constrained to prevent said spring elements from deflecting to become substantially coplanar, at least the portion of said body having the outer tapered surface and internal sealing surface being fabricated from a deformable material, whereby a water line may be pushed into said connector from said first end thereof, said connector may be inserted into said faucet shank with the outer tapered surface of said connector engaging said tapered internal inlet region of said shank and then forced thereinto to force tight engagement of the two tapers to effect a seal therebetween, and to at least locally constrict said body to effect forceful engagement of said internal sealing surface on the periphery of the inlet water line.

16. The connector of claim 15 wherein said body is comprised of first and second body members, said first body member extending from approximately the axial location of said spring member to said first end of said body, and said second body member extending from approximately the axial location of said spring member to said second end of said body, said spring member being trapped between said first and second body members.

17. The connector of claim 16 wherein said second body member is hygroscopic.

18. The connector of claim 17 wherein said second body member is a nylon member.

19. The connector of claim 16 wherein said first and second body members have cooperatively disposed surfaces for snapping together to entrap said spring member therebetween.

20. The connector of claim 15 wherein said body is plastic.

21. The connector of claim 15 further comprised of a lock nut for threading onto a faucet shank and engaging said shoulder of said connector body inserted into the shank and containing the end of a water line inserted thereto, whereby said lock nut may be tightened to force tight engagement of the two tapers to effect a seal therebetween, and to at least locally constrict said body to effect forceful engagement of said internal sealing surface with the periphery of the inlet water line.

22. The connector of claim 21 wherein said lock nut is plastic.

23. The connector of claim 22 wherein said lock nut includes wings for the tightening thereof by hand.

* * * * *

UNITED STATES PATENT AND TRADEMARK OFFICE
CERTIFICATE OF CORRECTION

PATENT NO. : 4,655,486

DATED : April 7, 1987

INVENTOR(S) : Tarnay et al.

It is certified that error appears in the above-identified patent and that said Letters Patent is hereby corrected as shown below:

| COLUMN | LINE | DESCRIPTION |
|---|---|---|
| 4 | 23 | Delete "conductive" and insert --conducive-- |
| 6 | 49 | Delete "deflectble" and insert --deflectable-- |
| 8 | 9 | Delete "wtihin" and insert --within-- |

Signed and Sealed this

Twenty-sixth Day of January, 1988

Attest:

DONALD J. QUIGG

Attesting Officer

Commissioner of Patents and Trademarks